US012531355B2

(12) United States Patent
Luo et al.

(10) Patent No.: US 12,531,355 B2
(45) Date of Patent: Jan. 20, 2026

(54) CONNECTOR AND INTELLIGENT LOCK

(71) Applicant: Flex, Ltd., Singapore (SG)

(72) Inventors: Baojun Luo, Shenzhen (CN); Manling Xie, Shenzhen (CN)

(73) Assignee: Flex Ltd., Singapore (SG)

( * ) Notice: Subject to any disclaimer, the term of this patent is extended or adjusted under 35 U.S.C. 154(b) by 276 days.

(21) Appl. No.: 17/961,152

(22) Filed: Oct. 6, 2022

(65) Prior Publication Data

US 2023/0123817 A1 Apr. 20, 2023

(30) Foreign Application Priority Data

Oct. 15, 2021 (CN) ......................... 202111203686.0

(51) Int. Cl.
*H01R 9/03* (2006.01)
*H01R 9/16* (2006.01)
*H01R 9/24* (2006.01)

(52) U.S. Cl.
CPC ................. *H01R 9/03* (2013.01); *H01R 9/16* (2013.01); *H01R 9/2416* (2013.01); *H01R 9/2475* (2013.01)

(58) Field of Classification Search
CPC .......... H01R 9/03; H01R 9/16; H01R 9/2416; H01R 9/2475; H01R 13/436
See application file for complete search history.

(56) References Cited

U.S. PATENT DOCUMENTS 6,641,437 B2 11/2003 Tsuji et al.
6,672,910 B2 1/2004 Hotea
7,695,289 B1 4/2010 Sato et al.
9,548,556 B2 * 1/2017 Uchida .............. H01R 13/5205
2008/0146065 A1 6/2008 Pandey et al.
2011/0028033 A1 2/2011 Sato et al.

FOREIGN PATENT DOCUMENTS

| | | |
|---|---|---|
| CN | 113948895 | 1/2022 |
| EP | 3633797 | 4/2020 |
| KR | 102235311 | 4/2021 |

OTHER PUBLICATIONS

Search Report for Great Britain Patent Application No. 2215042.9, dated Apr. 26, 2023 4 pages.

* cited by examiner

*Primary Examiner* — Renee S Luebke
*Assistant Examiner* — Paul D Baillargeon
(74) *Attorney, Agent, or Firm* — Sheridan Ross P.C.

(57) ABSTRACT

The present disclosure provides a connector, which relates to the technical field of electrical connection devices, so as to solve the problem of poor connection stability of connectors in existing technologies. The connector includes a mounting base and a binding post, wherein the binding post has both sides symmetrically provided with a fixed fin, the mounting base defines thereon a mounting groove for mounting the binding post, two sides of the mounting groove define a limit groove, and the fixed fin is clamped in the limit groove so as to enable the binding post to be limited to the mounting groove. The connector according to the present disclosure has good connection stability and can effectively transmit current or signal, enabling an effective cooperation between connected devices.

9 Claims, 7 Drawing Sheets

CONNECTOR AND INTELLIGENT LOCK

CROSS REFERENCE TO RELATED APPLICATIONS

This application claims the benefit of Chinese Application No. CN202111203686A, filed Oct. 15, 2021, the contents of which are incorporated herein by reference in its entirety.

TECHNICAL FIELD

The present disclosure relates to the technical field of electrical connection devices, and in particular to a connector and an intelligent lock.

BACKGROUND

Connector, as an indispensable part of electronic equipment, is widely used in various electronic equipment, which greatly improves the production and maintenance efficiency of electronic products. Connector is an electronic product connecting two active devices, which can transmit current or signal. The connector is arranged at an interruption position in a circuit or between isolated circuits to set up a bridge of communication, so that the current flows and the circuits achieve an expected function. The quality of connection is directly related to the safe and reliable operation of the whole system. The forms and structures of connector are ever changing. There are various types of connectors depending on different application objects, different frequencies, different powers, different environments, etc.

Intelligent locks are widely used on doors of live rooms, offices, warehouses, etc. The electronic intelligent lock industry generally connects the current and signals of a front panel assembly, a lock and a back panel assembly using PVC electronic wires via a connector. At present, the connector of the intelligent lock generally employs a single-row female header structure; the connector needs to be assembled many times, besides, the connector is big, thus the assembling and processing cost is raised. In addition, the connector itself is not waterproof, and a cover needs to be added outside the connector to seal and achieve water resistance, which results in a large size and complex assembling. In particular, the connection terminals of the existing connectors are easy to move, which makes it impossible to locate the contact point and leads to a poor stability of electrical connection and cooperation.

SUMMARY

The present disclosure aims to provide a connector and an intelligent lock, so as to solve the problem of poor connection stability of connectors in existing technologies. The connector according to the present disclosure has good connection stability and can effectively transmit current or signal, enabling an effective cooperation between connected devices.

The present disclosure provides a connector, including a mounting base and a binding post, wherein the binding post has both sides symmetrically provided with a fixed fin, the mounting base defines thereon a mounting groove for mounting the binding post, two sides of the mounting groove define a limit groove, and the fixed fin is clamped in the limit groove so as to enable the binding post to be limited to the mounting groove.

In a preferred embodiment of the present disclosure, the binding post includes a first connection terminal and a second connection terminal, the first connection terminal defines a horizontal jack for connecting to a first connector lug, the second connection terminal defines a vertical jack for connecting to a second connector lug, the first connection terminal is connected with the second connection terminal and the second connection terminal is arranged by extending downwards from the connection position, the fixed fin is arranged at one side of a lower end of the second connection terminal near the first connection terminal.

In a preferred embodiment of the present disclosure, two sides of the first connection terminal are provided with an inward curl edge, the two inward curl edges are curled inwards opposite each other to form a horizontal jack in the first connection terminal, the second connection terminal includes two clamping jaws arranged opposite each other, the two clamping jaws are connected to two sides of the first connection terminal through a joining edge respectively and the two clamping jaws form a vertical jack therebetween, and the fixed fin is arranged on an outer side of the joining edge.

In a preferred embodiment of the present disclosure, the mounting groove includes a horizontal accommodation groove for mounting the first connection terminal and a vertical accommodation groove for mounting the second connection terminal, the limit groove is provided between the horizontal accommodation groove and the vertical accommodation groove, the limit groove, the horizontal accommodation groove and the vertical accommodation groove are intercommunicated with one another.

In a preferred embodiment of the present disclosure, the horizontal accommodation groove has a depth of a, the limit groove has a depth of b, and the vertical accommodation groove has a depth of c, and they meet $a<b<c$; a limit post is arranged between the limit grooves on two sides, and the limit post is formed by a bottom surface of the horizontal accommodation groove extending towards the vertical accommodation groove.

In a preferred embodiment of the present disclosure, a plurality of binding posts are arranged, the mounting base defines a central hole at a center thereof, a plurality of mounting grooves are defined, the plurality of mounting grooves are arranged symmetrically in two rows on two sides of the central hole, each binding post is mounted in one mounting groove respectively, and the horizontal accommodation groove is provided on one side of the mounting groove near the central hole.

In a preferred embodiment of the present disclosure, two side edges of the central hole are provided with a shunting baffle respectively, and the two rows of mounting grooves are symmetrical with respect to a connection line between the centers of the two shunting baffles.

In a preferred embodiment of the present disclosure, the connector further includes a baseplate, an upper cover and a sealing ring, wherein the baseplate defines a recess thereon, the mounting base is mounted in the recess of the baseplate, the upper cover covers on the mounting base and is fixed in the recess of the baseplate; an outer side of the recess defines a clamping groove along the periphery of the baseplate, the sealing ring is provided with a flange matched with the clamping groove, and the sealing ring is arranged on the baseplate along the periphery of the upper cover; the upper cover defines a wiring hole at a position thereof corresponding to the vertical accommodation groove, the second connector lug is inserted into the wiring hole to connect to the second connection terminal; the baseplate defines a wire through hole at a position thereof corresponding to the central hole, a transmission wire passes through the wire through hole and the central hole so that the first connector lug extends to the mounting groove of the mounting base and connects to the first connection terminal.

In a preferred embodiment of the present disclosure, two sides of the mounting base and the upper cover define an inward shrinking notch respectively, the notch is arranged on an outer side of the shunting baffle correspondingly, two sides of the sealing ring are provided with a connection fin extending inwards respectively, the connection fin is arranged on the baseplate corresponding to the notches of the mounting base and the upper cover, two sides of the baseplate define a connection hole respectively, and the sealing ring is connected onto the baseplate through a connection piece which penetrates through the connection hole and the connection fin.

The present disclosure further provides an intelligent lock, including the above connector.

Compared with existing technologies, the present disclosure has the following beneficial effects.

The connector provided in the present disclosure is provided with a mounting base and a binding post, wherein the binding post has both sides symmetrically provided with a fixed fin, the mounting base defines thereon a mounting groove for mounting the binding post, two sides of the mounting groove define a limit groove, and the fixed fin is clamped in the limit groove so as to enable the binding post to be limited to the mounting groove. The connector of the present embodiment makes the binding post limited to the mounting groove by arranging the fixed fin on the binding post and defining the limit groove on the mounting base; when the connector connects two different devices, two wires are connected on the binding post of the connector; the binding post is fixed in position, which enables a good connection stability and an effective transmission of current or signal between the two wires, and enables an effective cooperation between the connected devices.

The connector provided in the present embodiment is provided with a baseplate, an upper cover and a sealing ring, wherein an outer side of the recess defines a clamping groove along the periphery of the baseplate, the sealing ring is provided with a flange matched with the clamping groove, and the sealing ring is arranged on the baseplate along the periphery of the upper cover. The sealing ring provides a good waterproof performance for the connector, so that the connector can be normally used in a damp environment while having a small volume.

BRIEF DESCRIPTION OF THE DRAWINGS

For a better understanding of the technical scheme in the embodiments of the present disclosure or in existing technologies, accompanying drawings needed in the description of the embodiments or existing technologies are simply illustrated below. Obviously, the accompanying drawings described below are some embodiments of the present disclosure. For the ordinary skill in the field, other accompanying drawings may be obtained according to these accompanying drawings without creative work.

DESCRIPTION OF DESIGNATORS IN DRAWINGS

Figure 1:
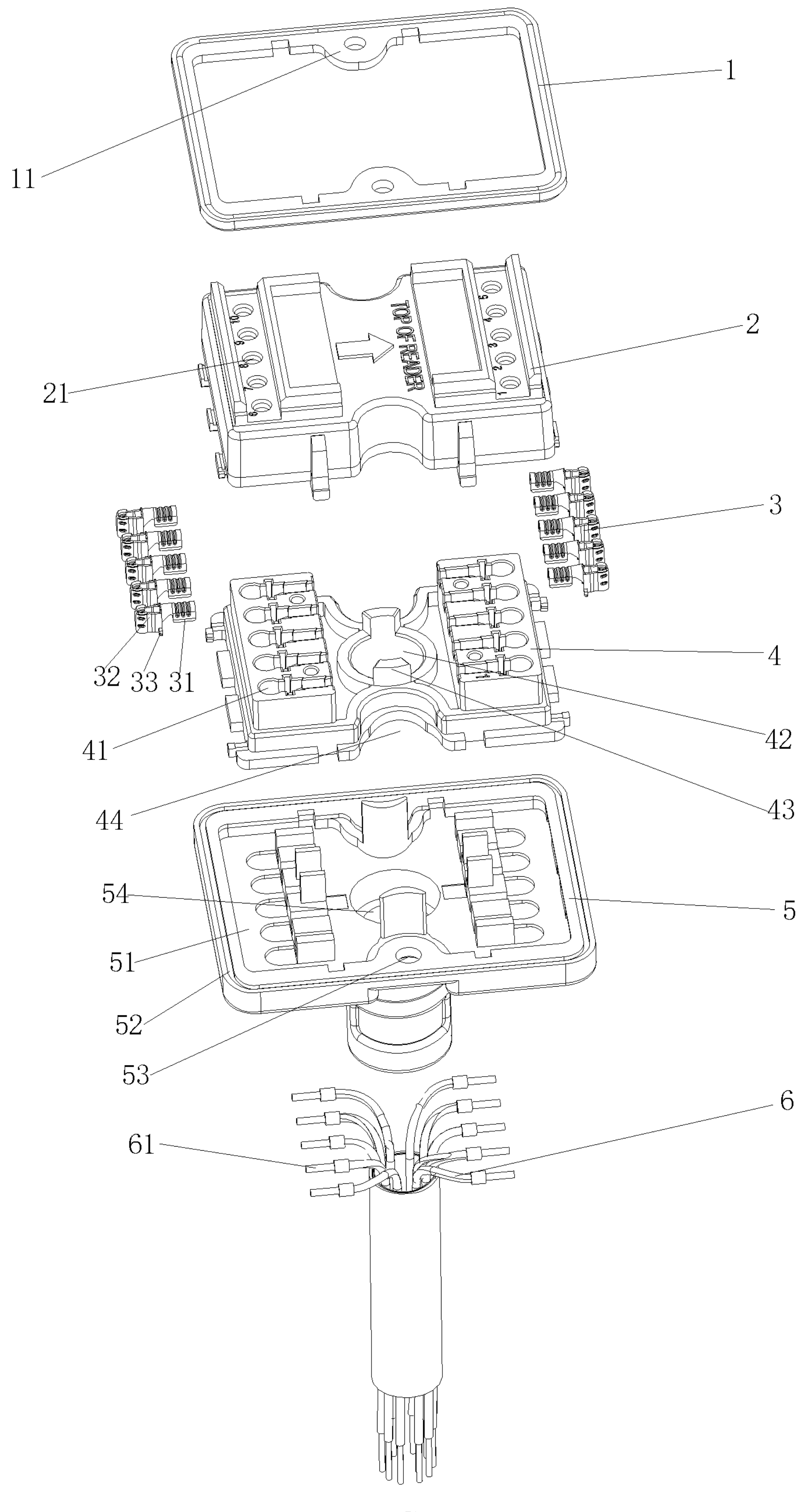
FIG. 1 is an exploded view of a connector according to the present disclosure.

1 represents a sealing ring, 11 represents a connection fin, 12 represents a flange, 2 represents an upper cover, 21 represents a wiring hole, 3 represents a binding post, 31 represents a first connection terminal, 311 represents an inward curl edge, 312 represents a horizontal jack, 32 represents a second connection terminal, 321 represents a clamping jaw, 322 represents a joining edge, 323 represents a vertical jack, 33 represents a fixed fin, 4 represents a mounting base, 41 represents a mounting groove, 411 represents a horizontal accommodation groove, 412 represents a vertical accommodation groove, 413 represents a limit groove, 414 represents a limit post, 42 represents a central hole, 43 represents a shunting baffle, 44 represents a notch, 5 represents a baseplate, 51 represents a recess, 52 represents a clamping groove, 53 represents a connection hole, 54 represents a wire through hole, 6 represents a transmission wire, 61 represents a first connector lug, and 7 represents a connection piece.

DETAILED DESCRIPTION

In the description of the present disclosure, unless otherwise stated, it is to be noted that “a plurality of” means two or more than two; directional or positional relations indicated by terms such as “upper”, “lower”, “front”, “back”, “left”, “right”, “top”, “bottom”, “inner”, “outer”, “front end”, “rear end”, “head”, “tail” etc. are directional or positional relations shown based on the drawings, merely to conveniently describe the present disclosure and simplify the description, but to indicate or imply the designated device or element to be constructed and operated in a specific position or in a specific direction; therefore, the used directional terms cannot be understood as a limit to the present disclosure. In addition, terms such as “first”, “second” “third”, etc. are merely for the purpose of description, but cannot be understood as the indication or implication of relative importance.

In the present disclosure, unless otherwise specifically stated and defined, terms “install”, “interconnect”, “connect”, etc. should be interpreted expansively. For example, they may be fixed connection, also may be detachable connection, or integrated connection; may be mechanical connection, also may be electrical connection; may be direct connection, also may be indirect connection through an intermediate. The ordinary skill in this field can understand the specific implication of the above terms in the present disclosure in accordance with specific conditions.

A further detailed description is provided to specific embodiments of the present disclosure in conjunction with accompanying drawings.

Embodiment 1

The present embodiment provides a connector, which as shown in FIG. 1 to FIG. 8 includes a mounting base 4 and a binding post 3, wherein the binding post 3 has both sides symmetrically provided with a fixed fin 33, the mounting base 4 defines thereon a mounting groove 41 for mounting the binding post 3, two sides of the mounting groove 41 define a limit groove 413, and the fixed fin 33 is clamped in the limit groove 413 so as to enable the binding post 3 to be limited to the mounting groove 41. The connector of the present embodiment makes the binding post 3 limited to the mounting groove 41 by arranging the fixed fin 33 on the binding post 3 and defining the limit groove 413 on the mounting base 4; when the connector connects two different devices, two wires are connected on the binding post 3 of the connector; the binding post 3 is fixed in position, which enables a good connection stability and an effective transmission of current or signal between the two wires, and enables an effective cooperation between the connected devices.

Preferably, as shown in FIG. 1, the binding post 3 includes a first connection terminal 31 and a second connection terminal 32, the first connection terminal 31 defines a horizontal jack 312 for connecting to a first connector lug 61, the second connection terminal 32 defines a vertical jack 323 for connecting to a second connector lug, the first connection terminal 31 is connected with the second connection terminal 32 and the second connection terminal 32 is arranged by extending downwards from the connection position, the fixed fin 33 is arranged at one side of a lower end of the second connection terminal 32 near the first connection terminal 31. The first connection terminal 31 and the second connection terminal 32 are of an integrated structure. The first connection terminal 31 and the second connection terminal 32 are configured for connecting to two connector lugs of two wires respectively, thereby connecting the two wires.

Figure 3:
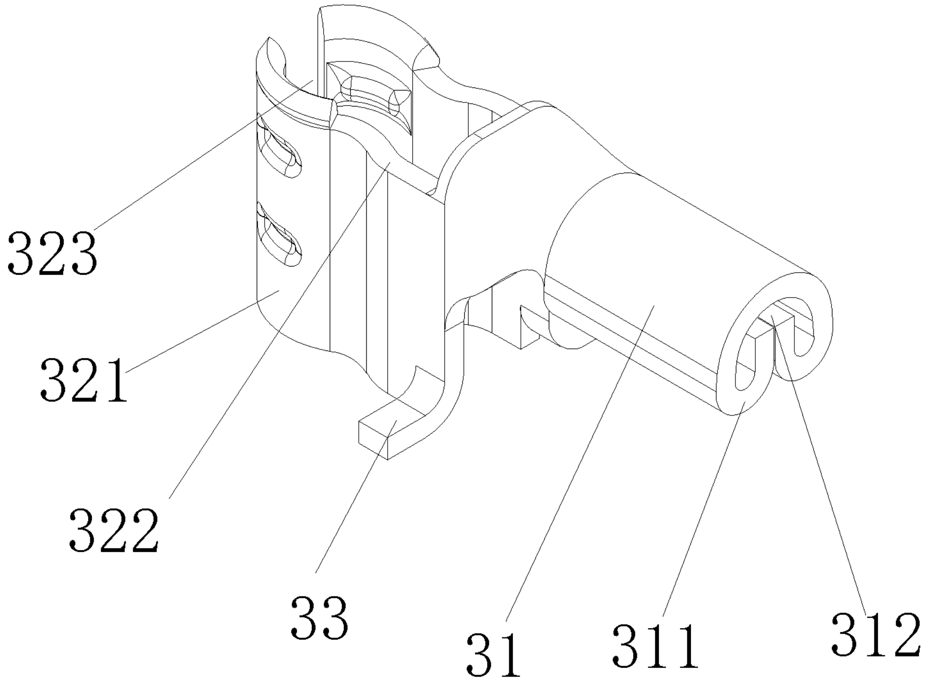
FIG. 3 is a structure diagram of a binding post in the present disclosure.

Preferably, as shown in FIG. 3, two sides of the first connection terminal 31 are provided with an inward curl edge 311, the two inward curl edges 311 are curled inwards opposite each other to form a horizontal jack 312 in the first connection terminal 31; when the first connector lug 61 is connected onto the first connection terminal 31, the two inward curl edges 311 are curled inwards to clamp the first connector lug 61, so that the first connector lug 61 is connected into the horizontal jack 312. The second connection terminal 32 includes two clamping jaws 321 arranged opposite each other, the two clamping jaws 321 are connected to two sides of the first connection terminal 31 through a joining edge 322 respectively and the two clamping jaws 321 form a vertical jack 323 therebetween, and the fixed fin 33 is arranged on an outer side of the joining edge 322. When the second connector lug is connected onto the second connection terminal 32, the second connector lug is vertically inserted between the two clamping jaws 321, and the clamping jaws 321 tightly clamp the second connector lug, so that the second connector lug is connected into the vertical jack 323 of the second connection terminal 32. The binding post 3 is shaped by a copper sheet, enabling the first connection terminal 31 and the second connection terminal 32 to tighten the horizontal jack and the vertical jack under the elastic action of the cooper sheet, so that the connector lug is connected onto the binding post.

Figure 2:
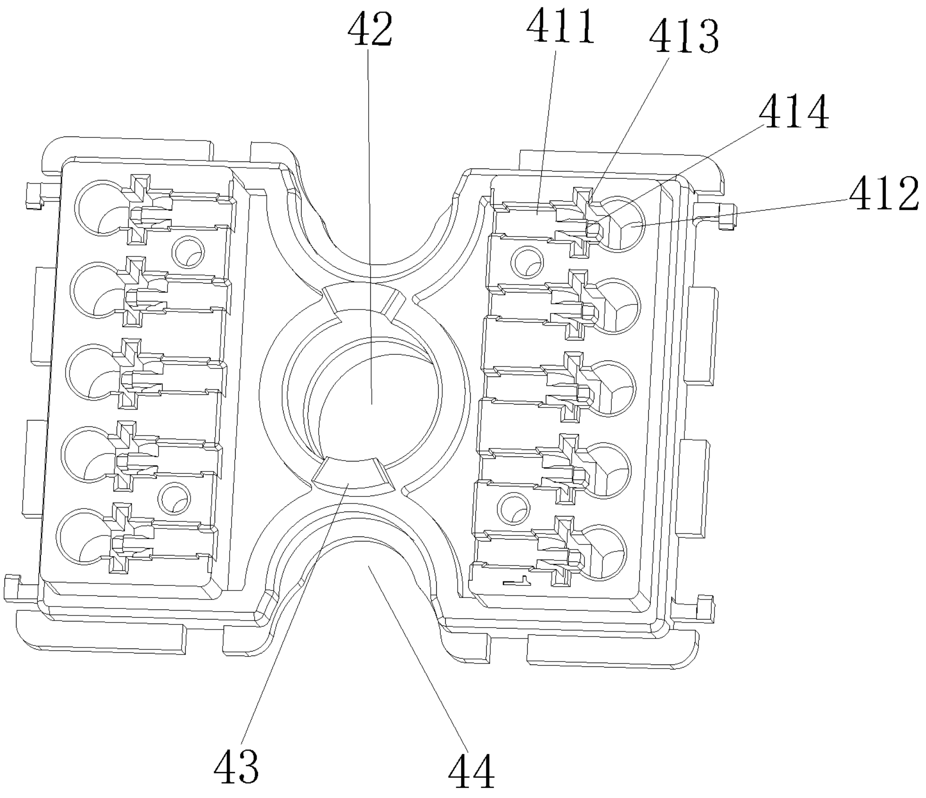
FIG. 2 is a structure diagram of a mounting base in the present disclosure.

Preferably, as shown in FIG. 2, the mounting groove 41 includes a horizontal accommodation groove 411 for mounting the first connection terminal 31 and a vertical accommodation groove 412 for mounting the second connection terminal 32, the limit groove 413 is provided between the horizontal accommodation groove 411 and the vertical accommodation groove 412, the limit groove 413, the horizontal accommodation groove 411 and the vertical accommodation groove 412 are intercommunicated with one another. When the binding post 3 is installed in the mounting groove 41, the horizontal accommodation groove 411 accommodates the first connection terminal 31, the vertical accommodation groove 412 accommodates the second connection terminal 32, and the fixed fin 33 is clamped in the limit groove 413, thereby enabling the binding post 3 to be limited to the mounting groove 41.

Figure 7:
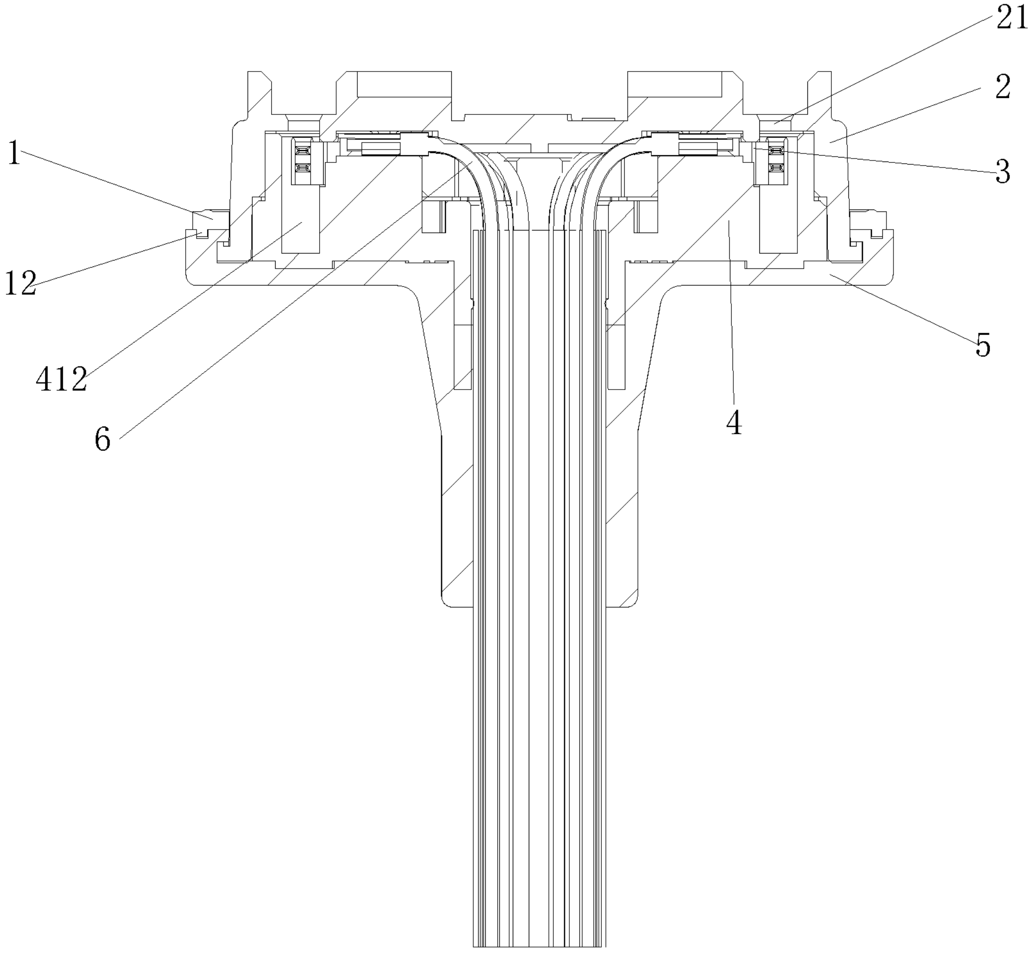
FIG. 7 is a sectional view of FIG. 6 along A-A.

Preferably, as shown in FIG. 2 and FIG. 7, the horizontal accommodation groove 411 has a depth of a, the limit groove 413 has a depth of b, and the vertical accommodation groove 412 has a depth of c, and they meet $a<b<c$; a limit post 414 is arranged between the limit grooves 413 on two sides, and the limit post 414 is formed by a bottom surface of the horizontal accommodation groove 411 extending towards the vertical accommodation groove 412. When the binding post 3 is installed in the mounting groove 41, the limit post 414 is clamped between the first connection terminal 31 and the second connection terminal 32, thereby further limiting the binding post 3. When the binding post 3 is installed in the mounting groove 41, as the fixed fin 33 is arranged on the bottom end of the second connection terminal 32, the fixed fin 33 is clamped at the bottom of the limit groove 413, the second connection terminal 32 extends into the vertical accommodation groove 412 till the middle part of the vertical accommodation groove 412, such that a distance is reserved between the bottom part of vertical accommodation groove 412 and the bottom part of the second connection terminal 32, and such that the second connector lug can extend into the vertical accommodation groove 412 below the second connection terminal 32 when inserted into the vertical jack 323 of the second connection terminal 32, so that the second connector lug has a more stable connection with the second connection terminal 32.

Figure 4:
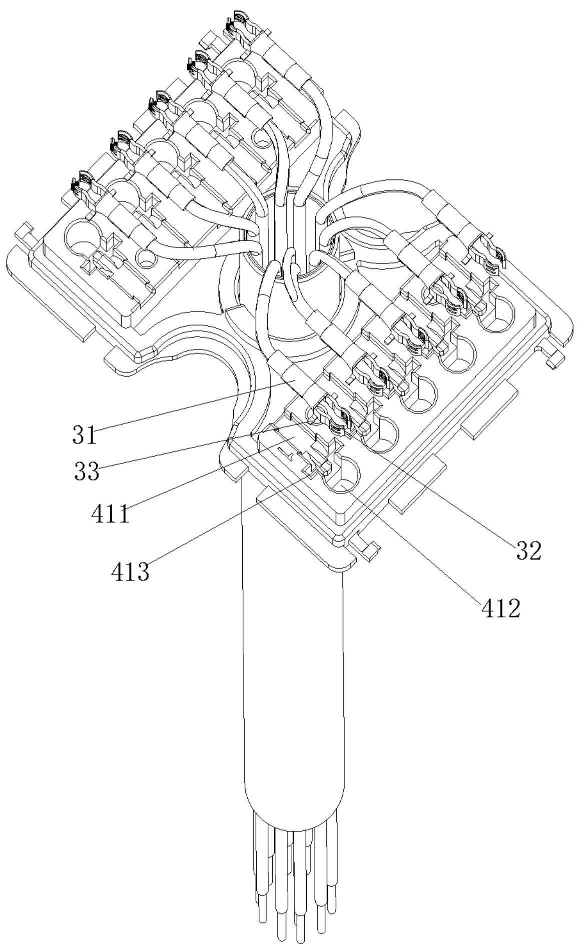
FIG. 4 is a structure diagram of a binding post being above a mounting base in the present disclosure.
Figure 5:
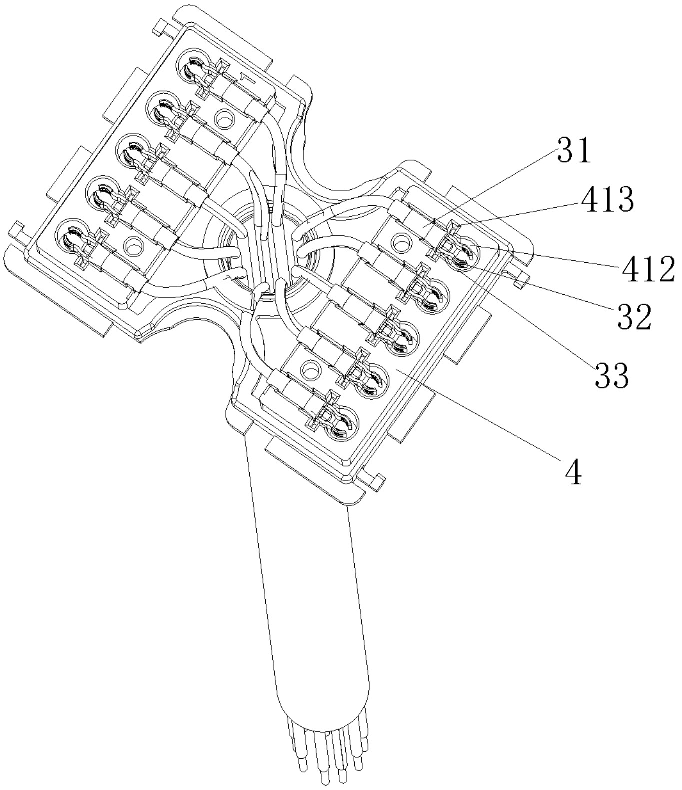
FIG. 5 is a structure diagram of a binding post installed on a mounting base in the present disclosure.
Figure 6:
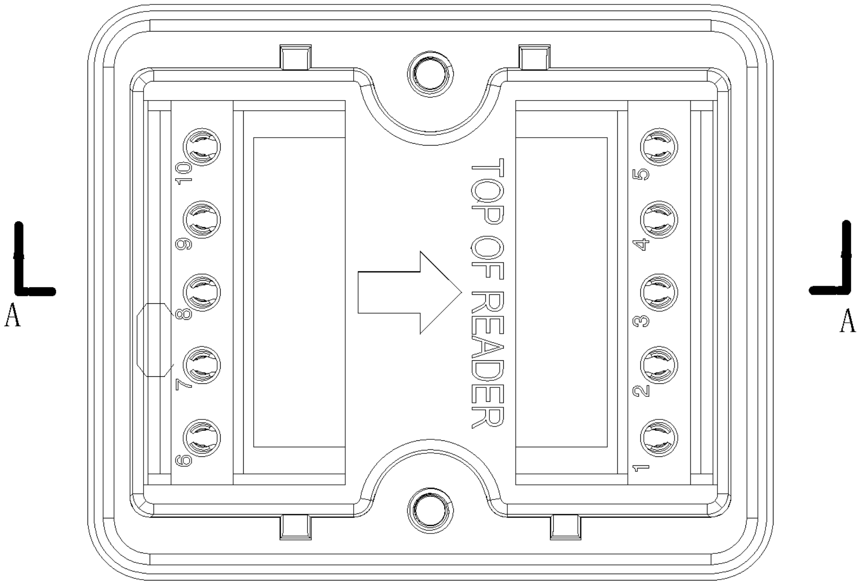
FIG. 6 is a top view of a connector according to the present disclosure.

Preferably, as shown in FIG. 4 and FIG. 5, a plurality of binding posts 3 are arranged, the mounting base 4 defines a central hole 42 at a center thereof, a plurality of mounting grooves 41 are defined, the plurality of mounting grooves 41 are arranged symmetrically in two rows on two sides of the central hole 42, each binding post 3 is mounted in one mounting groove 41 respectively, and the horizontal accommodation groove 411 is provided on one side of the mounting groove 41 near the central hole 42. A plurality of transmission wires 6 can pass through the central hole 42 to the mounting base 4, so that the first connector lug 61 extends into the mounting groove 41. The plurality of binding posts 3 are arranged in two rows on the mounting base 4; the mounting positions of the binding posts 3 are reasonably arranged so that many binding posts 3 can be installed on a mounting base of a small volume, which reduces the volume of the mounting base, thereby reducing the volume of the connector of the present embodiment and lowering the cost.

Preferably, as shown in FIG. 2, two side edges of the central hole 42 are provided with a shunting baffle 43 respectively, and the two rows of mounting grooves 41 are symmetrical with respect to a connection line between the centers of the two shunting baffles 43. The shunting baffle 43 separates the transmission wires onto its two sides, so that the transmission wires 6 are connected to two sides of the mounting base 4.

Preferably, as shown in FIG. 1 and FIG. 7, the connector of the present embodiment further includes a baseplate 5, an upper cover 2 and a sealing ring 1, wherein the baseplate 5 defines a recess 51 thereon, the mounting base 4 is mounted in the recess 51 of the baseplate, the upper cover 2 covers on the mounting base 4 and is fixed in the recess 51 of the baseplate. As shown in FIG. 1, an outer side of the recess 51 defines a clamping groove 52 along the periphery of the baseplate 5; as shown in FIG. 7, the sealing ring 1 is provided with a flange 12 matched with the clamping groove 52, and the sealing ring 1 is arranged on the baseplate 5 along the periphery of the upper cover 2. The sealing ring 1 is arranged tightly close to the side wall of the upper cover 2, thereby sealing the connection position between the upper cover 2 and the baseplate 5, so that the connector of the present embodiment has a good waterproof performance and avoids the installation of a waterproof shell on the outer side thereof, which does not increase the volume of the connector, so that the connector can be normally used in a damp environment while having a small volume.

As shown in FIG. 1, the upper cover 2 defines a wiring hole 21 at a position thereof corresponding to the vertical accommodation groove 412, the second connector lug is inserted into the wiring hole 21 to connect to the second connection terminal 32, which enables a quick connection and a convenient usage. The baseplate 5 defines a wire through hole 54 at a position thereof corresponding to the central hole 42, a transmission wire 6 passes through the wire through hole 54 and the central hole 42 so that the first connector lug 61 extends to the mounting groove 41 of the mounting base 4 and connects to the first connection terminal 31. Thus, the first connector lug 61 and the second connector lug of two wires are connected through the connector, thereby realizing the transmission of current or signal of two devices.

Figure 8:
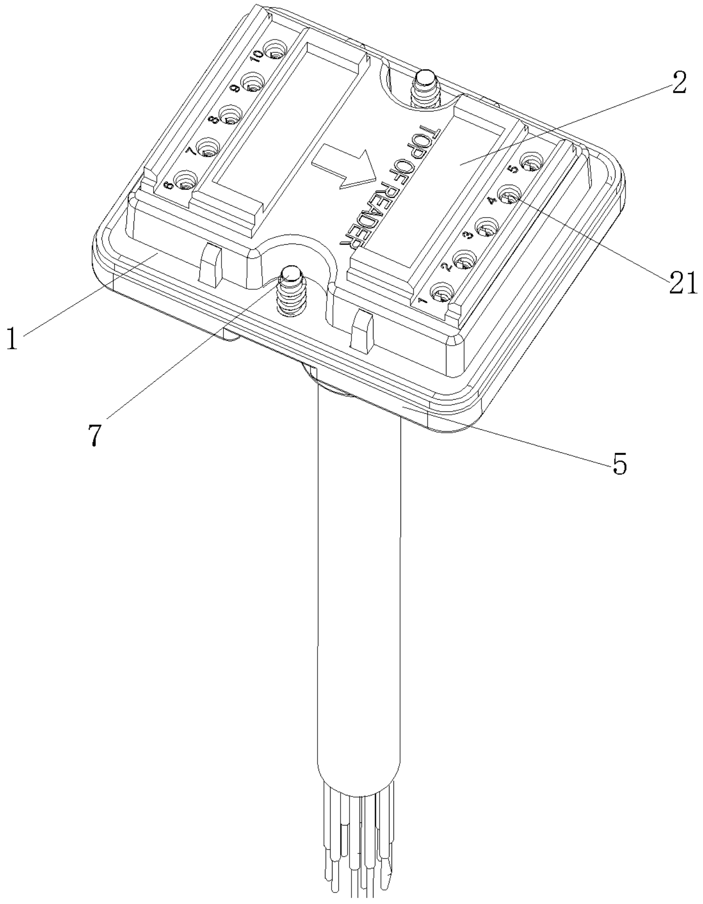
FIG. 8 is a structure diagram of a connector according to the present disclosure.

Preferably, as shown in FIG. 8 and FIG. 1, two sides of the mounting base 4 and the upper cover 2 define an inward shrinking notch 44 respectively, the notch 44 is arranged on an outer side of the shunting baffle 43 of the mounting base 4 correspondingly, two sides of the sealing ring 1 are provided with a connection fin 11 extending inwards respectively, the connection fin 11 is arranged on the baseplate 5 corresponding to the notches of the mounting base 4 and the upper cover 2, two sides of the baseplate 5 define a connection hole 53 respectively, and the sealing ring 1 is connected onto the baseplate 5 through a connection piece 7 which penetrates through the connection hole 53 and the connection fin 11, which achieves a better sealing effect for the sealing ring 1. The connection piece 7 is a bolt.

Embodiment 2

The present embodiment provides an intelligent lock, including a connector described in Embodiment 1. The connector connects a front panel assembly, a lock and a back panel assembly of the intelligent lock to transmit current or signal, achieving a good stability for the current or signal of the intelligent lock of the present embodiment. The connector has a good waterproof performance while having a small volume.

The other structure part of the intelligent lock not described in the present disclosure belongs to existing technologies.

The above are the preferred embodiments of the present disclosure merely; however, the protection scope of the present disclosure is not limited to this. It should be noted that, for those skilled in this art, multiple improvements and modifications can be made without departing from the principle of the present disclosure, and these improvements and modifications shall fall into the scope of protection of the present disclosure.

What is claimed is:

1. A connector, comprising a mounting base and a binding post, wherein the binding post has a first side and a second side, the first side and the second side symmetrically provided with a fixed fin, a first connection terminal and a second connection terminal, the first connection terminal horizontally connecting to a first connector lug, the second connection terminal vertically connecting to a second connector lug, the first connection terminal is connected with the second connection terminal thereby forming a connection position and the second connection terminal is arranged by extending downwards from the connection position, the fixed fin is arranged at one side of a lower end of the second connection terminal near the first connection terminal, the mounting base defines thereon a mounting groove for mounting the binding post, two sides of the mounting groove define a limit groove, and the fixed fin is clamped in the limit groove so as to enable the binding post to be limited to the mounting groove.

2. The connector according to claim 1, wherein two sides of the first connection terminal are provided with an inward curl edge, the two inward curl edges are curled inwards opposite each other to form the first connection terminal, the second connection terminal comprises two clamping jaws arranged opposite each other, the two clamping jaws are connected to two sides of the first connection terminal through a joining edge respectively and the two clamping jaws form the second connection terminal therebetween, and the fixed fin is arranged on an outer side of the joining edge.

3. The connector according to claim 1, wherein the mounting groove comprises a horizontal accommodation groove for mounting the first connection terminal and a vertical accommodation groove for mounting the second connection terminal, the limit groove is provided between the horizontal accommodation groove and the vertical accommodation groove, the limit groove, the horizontal accommodation groove and the vertical accommodation groove are intercommunicated with one another.

4. The connector according to claim 3, wherein the horizontal accommodation groove has a depth of a, the limit groove has a depth of b, and the vertical accommodation groove has a depth of c, and they meet $a<b<c$; a limit post is arranged between the limit groove on two sides, and the limit post is formed by a bottom surface of the horizontal accommodation groove extending towards the vertical accommodation groove.

5. The connector according to claim 4, wherein a plurality of binding posts are arranged, the mounting base defines a central hole at a center thereof, a plurality of mounting grooves are defined, the plurality of mounting grooves are arranged symmetrically in two rows on two sides of the central hole, each binding post is mounted in one mounting groove respectively, and the horizontal accommodation groove is provided on one side of the mounting groove near the central hole.

6. The connector according to claim 5, wherein two side edges of the central hole are provided with a shunting baffle respectively, and the two rows of mounting grooves are symmetrical with respect to a connection line between the centers of the two shunting baffles.

7. The connector according to claim 5, further comprising a baseplate, an upper cover and a sealing ring, wherein the baseplate defines a recess thereon, the mounting base is mounted in the recess of the baseplate, the upper cover covers the mounting base and is fixed in the recess of the baseplate; an outer side of the recess defines a clamping groove along the periphery of the baseplate, the sealing ring is provided with a flange matched with the clamping groove, and the sealing ring is arranged on the baseplate along the periphery of the upper cover; the upper cover defines a wiring hole at a position thereof corresponding to the vertical accommodation groove, the second connector lug is inserted into the wiring hole to connect to the second connection terminal; the baseplate defines a wire through hole at a position thereof corresponding to the central hole, a transmission wire passes through the wire through hole and the central hole so that the first connector lug extends to the mounting groove of the mounting base and connects to the first connection terminal.

8. The connector according to claim 7, wherein two sides of the mounting base and the upper cover define an inward shrinking notch respectively, the notch is arranged on an outer side of the shunting baffle of the mounting base, two sides of the sealing ring are provided with a first connection fin and a second connection fin extending inwards respectively, the connection fins are arranged on the baseplate corresponding to the notches of the mounting base and the upper cover, two sides of the baseplate define a connection hole respectively, and the sealing ring is connected onto the baseplate through a connection piece which penetrates through the connection hole and the connection fins.

9. An intelligent lock comprising:

a connector comprising, a mounting base and a binding post, wherein the binding post has a first side and a second side, the first side and the second side symmetrically provided with a fixed fin, a first connection terminal and a second connection terminal, the first connection terminal horizontally connecting to a first connector lug, the second connection terminal vertically connecting to a second connector lug, the first connection terminal is connected with the second connection terminal thereby forming a connection position and the second connection terminal is arranged by extending downwards from the connection position, the fixed fin is arranged at one side of a lower end of the second connection terminal near the first connection terminal, the mounting base defines thereon a mounting groove for mounting the binding post, two sides of the mounting groove define a limit groove, and the fixed fin is clamped in the limit groove so as to enable the binding post to be limited to the mounting groove.

* * * * *